United States Patent [19]

Ueda et al.

[11] Patent Number: 5,168,112

[45] Date of Patent: Dec. 1, 1992

[54] PROCESS FOR THE PREPARATION OF A POLYCARBONATE WITH PIPERIDINYL PYRIDINE CATALYST

[75] Inventors: Mitsuru Ueda, Yamagata; Tatsuya Kanno, Hyogo; Yoshihiro Iguchi, Hyogo; Yasuhiro Oshino, Hyogo, all of Japan

[73] Assignee: Daicel Chemical Industries, Ltd., Osaka, Japan

[21] Appl. No.: 638,975

[22] Filed: Jan. 8, 1991

Related U.S. Application Data

[63] Continuation-in-part of Ser. No. 475,206, Feb. 2, 1990, Pat. No. 5,025,083, which is a continuation-in-part of Ser. No. 423,336, Oct. 18, 1989, abandoned.

[30] Foreign Application Priority Data

Feb. 10, 1989 [JP] Japan .................................. 1-31904
Jun. 23, 1989 [JP] Japan .................................. 1-161039
Oct. 26, 1989 [JP] Japan .................................. 1-279048

[51] Int. Cl.$^5$ .............................................. C08G 64/20
[52] U.S. Cl. .................................. 528/199; 528/196; 528/198; 528/204
[58] Field of Search ................ 528/199, 196, 198, 204

[56] References Cited

U.S. PATENT DOCUMENTS 5,025,083 6/1991 Ueda et al. ...................... 528/199

FOREIGN PATENT DOCUMENTS 0382250 8/1990 European Pat. Off. .
63-199728 8/1988 Japan .

OTHER PUBLICATIONS

Patent Abstracts of Japan, vol. 12, No. 482 (C-553)[3329], Dec. 15, 1988.

*Primary Examiner*—Harold D. Anderson
*Attorney, Agent, or Firm*—Flynn, Thiel, Boutell & Tanis

[57] ABSTRACT

A polycarbonate is produced by melt-polycondensing a dihydric hydroxy compound and a bisarylcarbonate in the presence of 4-(4-methyl-1-piperidinyl)-pyridine, or a salt thereof, as a catalyst. The process of the invention eliminates the use of poisonous phosgene, prevents chloride ions from being incorporated into the product polycarbonate and remains in the reaction system longer to enable the preparation of high-molecular weight polycarbonates.

7 Claims, No Drawings

PROCESS FOR THE PREPARATION OF A POLYCARBONATE WITH PIPERIDINYL PYRIDINE CATALYST

This application is a continuation-in-part of U.S. patent application Ser. No. 07/475,206, filed Feb. 2, 1990 now U.S. Pat. No. 5,025,083, which is a continuation-in-part of U.S. patent application Ser. No. 07/423,336, filed Oct. 18, 1989, now abandoned.

The present invention relates to a process for preparing a high-molecular weight polycarbonate by melt-condensing a dihydric hydroxy compound and a bisaryl carbonate in the presence of a catalyst.

The high-molecular polycarbonate of the present invention is a general purpose engineering thermoplastic which can be used in wide applications, particularly in injection molding or as a glass sheet instead of a window glass.

Interfacial polycondensation is generally effective in producing a polycarbonate, but has drawbacks in that toxic phosgene is generally utilized in the reaction and chloride ions remain in the formed polycarbonate.

In order to eliminate these drawbacks, Japanese Patent Laid-Open No. 182336/1988 discloses production of a polycarbonate through interfacial polycondensation of a particular dihydric alcohol with liquid trichloromethyl chloroformate instead of toxic phosgene. However, only 9,9-bis(4-hydroxyphenyl)fluorene is described as the particular dihydric phenol. Angew. Chem., 99,922 (1987) describes that a polycarbonate is prepared from 2,2-bis(4-hydroxyphenyl)propane by making use of triphosgene instead of toxic phosgene. However, it also describes a reaction mechanism by which phosgene is generated.

EP-A-0382250 discloses a process for producing a polycarbonate by melt-polycondensing a dihydric hydroxy compound and a bisarylcarbonate in the presence of a catalyst selected from electron-donating amine compounds and salts thereof. As catalysts N-N-dimethyl-4-aminopyridine, 4-diethylaminopyridine, 4-pyrrolidinopyridine, 4-(5-quinolyl)-pyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, 2-aminopyridine, aminoquinoline, imidazole, 2-methylimidazole, 4-methylimidazole and diazabicyclooctane (DABCO) are disclosed.

These catalysts are, however, distilled off in a larger amount together with phenol and provide a product with a low number-average molecular weight.

It is therefore the object of the present invention to provide a process for producing a polycarbonate wherein the amount of catalyst distilled off is decreased and wherein a product with a high number-average molecular weight is obtained.

Said object is achieved by a process for producing a polycarbonate by melt-polycondensing a dihydric hydroxy compound and a bisarylcarbonate in the presence of a catalyst characterized in that 4-(4-methyl-1-piperidinyl)pyridine or a salt thereof is used as catalyst.

According to the process of the present invention it is possible to produce, without resorting to toxic phosgene, a high-molecular weight colorless transparent polycarbonate which is substantially free of chlorine ions. Furthermore, the amount of catalyst distilled off can be reduced.

According to one embodiment of the process according to the invention, the catalyst is selected among salts (excluding chlorides) of 4-(4-methyl-1-piperidinyl)-pyridine.

According to another preferred embodiment, the dihydric hydroxy compound is a dihydric phenol and the bisaryl carbonate is selected from the group consisting of (B) bisphenol carbonate, (C) bis(2,4,6-trichlorophenyl)carbonate, (D) bis(2,4-dichlorophenyl)carbonate and (E) bis-(2-cyanophenyl)carbonate.

Preferably, the dihydric hydroxy compound is selected from dihydric phenols represented by any of the following formulae (I), (II), (III), and (IV):

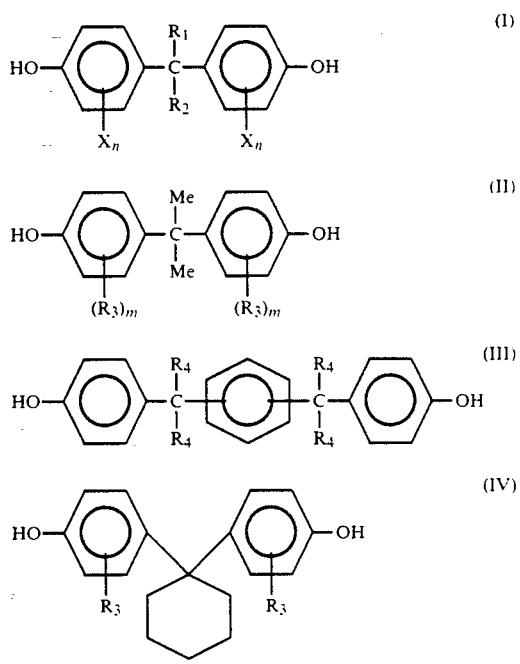

wherein $R_1$, $R_2$, $R_3$ and $R_4$ are each hydrogen, a straight chain or branched alkyl group having 1 to 8 carbon atoms, or a phenyl group, X is a halogen atom, n is 0 to 4, and m is 1 to 4.

In the present invention, the catalyst can be used in the form of a salt in which the counter ion is an acid including, for example, carbonic acid, acetic acid, formic acid, nitric acid, nitrous acid, oxalic acid, sulfuric acid, phosphoric acid, fluoroboric acid and hydroboric acid. Chlorides of the catalyst are excluded from the scope of the present invention.

Representative examples of the dihydric phenol include the following compounds. Examples of the bisphenol represented by the general formula (I) include 2,2-bis-(4-hydroxyphenyl)propane, 2,2-bis-(4-hydroxyphenyl)butane, 2,2-bis-(4-hydroxyphenyl)-4-methylpentane, 2,2-bis-(4-hydroxyphenyl)octane, 4,4'-dihydroxy-2,2,2-triphenylethane, and 2,2-bis-(3,5-dibromo-4-hydroxyphenyl)propane. Examples of the bisphenol represented by the general formula (II) include 2,2-bis-(4-hydroxy-3-methylphenyl)propane, 2,2-bis-(4-hydroxy-3-isopropylphenyl)propane, 2,2-bis-(4-hydroxy-3-secbutylphenyl)propane, 2,2-bis-(3,5-dimethyl-4-hydroxyphenyl)propane, and 2,2-bis-(4-hydroxy-3-tertbutylphenyl)propane. Examples of the bisphenol represented by the general formula (III) include 1,1'-bis-(4-hydroxyphenyl)-p-diisopropylbenzene, and 1,1'-bis-(4-hydroxyphenyl)-m-diisopropylbenzene. Examples of the bisphenol represented by the general formula (IV) include 1,1-bis(4-hydroxyphenyl)cyclohexane.

Further, it is also possible to prepare a polycarbonate copolymer through a combination of at least two dihydric hydroxy compounds, e.g., a combination of phenols selected from those represented by the general formulae (I), (II), (III) and (IV).

The method according to the present invention can be practiced by melt-polycondensing a dihydric hydroxy compound, such as bisphenol A, with a bisaryl carbonate, such as bisphenyl carbonate, in the presence of the catalyst.

This reaction is generally conducted at a temperature in the range of 100° to 300° C., preferably at 130° to 280° C. When the temperature is below 130° C., the reaction rate is reduced, while when the temperature exceeds 280° C., side reactions tend to occur.

The catalyst is generally used in an amount of $10^{-1}$ to $10^{-5}$ mol, preferable $10^{-2}$ to $10^{-4}$ mol based on 1 mol of the dihydric hydroxy compound present in the reaction system. When the amount is less than $10^{-5}$ mol, the rate of polymerization of polycarbonate is reduced because of poor catalytic action. On the other hand, when the amount is more than $10^{-1}$ mol, the proportion of the catalyst remaining in the resultant polycarbonate is increased, which brings about a lowering in the properties of the polycarbonate.

The bisaryl carbonate should be used in an equimolar amount to the dihydric hydroxy compound. In general, in order to form a high-molecular polycarbonate, 1 mol of a carbonate compound should be reacted with 1 mol of a dihydric hydroxy compound.

When bisphenyl carbonate is used, 2 mols of phenol is formed by the above-described reaction. The 2 mols of phenol thus formed are distilled away out of the reaction system.

When the bisaryl carbonate is one of (C), (D) and (E), it is preferable that m is 1 in the formula (II). When the reaction is conducted at a temperature ranging from 130° to 250° C., the amount of catalyst ranges from $10^{-1}$ to $10^{-3}$ mol.

The present invention will now be described by way of examples.

EXAMPLE 1

22.8 g (0.1 mol) of 2,2-bis (4-hydroxyphenyl)propane was mixed with 0.0176 g ($1\times10^{-4}$ mol) of 4-(4-methyl-1-piperidinyl)-pyridine and 21.4 g (0.1 mol) of bisphenyl carbonate, and the mixture was stirred at 180° C. for 1 hour in a nitrogen atmosphere. The temperature of the system was raised while gradually evacuating the system. Finally, polycondensation was conducted at 270° C. and 0.1 Torr for 1 hour and the formed phenol was distilled away to prepare a clear polycarbonate. The viscosity-average molecular weight ($\overline{M}v$) was determined to be 30,000. The glass transition temperature was 150° C.

The viscosity-average molecular weight was determined by measuring the intrinsic viscosity [η] of the polymer in the form of a methylene chloride solution at 20° C. with an Ubbelohde's viscometer and calculating the viscosity-average molecular weight ($\overline{M}v$) according to the following equation:

$$[\eta] = 1.11 \times 10^{-4} (\overline{M}v)^{0.82}$$

EXAMPLE 2

0.0236 g ($1\times10^{-4}$ mol) of the carbonate of 4-(4-methyl-1 piperidinyl)-pyridine was used instead of 4-(4-methyl-1-piperidinyl)-pyridine in the reaction system of Example 1 and the reaction was conducted under the same conditions as in Example 1. The mixture was stirred for 2 hours in a nitrogen atmosphere, and polycondensation was conducted in the same manner as in Example 1 to prepare a clear polycarbonate. The viscosity-average molecular weight ($\overline{M}v$) was determined to be 28,000. The glass transition temperature was 150° C.

EXAMPLE 3

11.4 g (50% by mol) of 2,2-bis(4-hydroxyphenyl)propane, 17.0 g (50% by mol) of 3,3-bis(4-hydroxy-3-tert-butylphenyl)propane, and 0.176 g ($10^{-3}$ mol) of 4-(4-methyl-1-piperidinyl)-pyridine were stirred for 2 hours in a nitrogen atmosphere, and polycondensation was conducted in the same manner as in Example 1 to prepare a clear polycarbonate. The viscosity-average molecular weight ($\overline{M}v$) was determined to be 26,500 and the glass transition temperature was 128° C.

COMPARATIVE EXAMPLE 1

The same treatment as in Example 1 was conducted by using pyridine instead of 4-(4-methyl-1-piperidinyl)-pyridine under the same reaction conditions as in Example 1. However, the viscosity-average molecular weight ($\overline{M}v$) of the resultant polycarbonate was as low as 4,000, which is unsuitable for practical use although it was in the form of polycarbonate.

EXAMPLE 4

42.09 g (0.1 mol) of bis(2,4,6-trichlorophenyl)carbonate was added to 22.8 g (0.1 mol) of 2,2-bis(4-hydroxyphenyl)propane and 0.176 g of 4-(4-methyl-1-piperidinyl)-pyridine, and the mixture was stirred at 160° C. for 1 hour in a nitrogen atmosphere. The temperature of the system was raised while gradually evacuating the system. Finally, polycondensation was conducted at 230° C. and 0.1 Torr for 1 hour and the formed 2,4,6-trichlorophenol was distilled away to prepare a clear polycarbonate. The viscosity-average molecular weight ($\overline{M}v$) was determined to be 30,000. The glass transition temperature was 150° C.

The viscosity-average molecular weight was determined by measuring the intrinsic viscosity [η] of the polymer in the form of a methylene chloride solution at 20° C. with an Ubbelohde's viscometer and calculating the viscosity-average molecular weight ($\overline{M}v$) according to the following equation:

$$[\eta] = 1.11 \times 10^{-4} (\overline{M}v)^{0.82}$$

EXAMPLE 5

0.0236 g of the carbonate of 4-(4-methyl-1-piperidinyl)-pyridine was added under the same reaction condition as in Example 4. The mixture was stirred for 2 hours in a nitrogen atmosphere, and polycondensation was conducted in the same manner as in Example 1 to prepare a clear polycarbonate. The viscosity-average molecular weight ($\overline{M}v$) was determined to be 28,000. The glass transition temperature was 150° C.

What is claimed is:

1. A process for producing a polycarbonate by melt-polycondensing (A) at least one dihydric phenol with (B) a bisarylcarbonate in the presence of a catalyst comprising 4-(4-methyl-1-piperidinyl)-pyridine or a salt thereof.

2. The process of claim 1, in which the catalyst is the salt.

3. The process of claim 1, in which the dihydric hydroxy compound is a dihydric phenol and the bisarylcarbonate is selected from among the group consisting of bisphenyl carbonate, bis(2,4,6-trichloropehnyl)carbonate, bis(2,4-dichlorophenyl)carbonate and bis(2-cyanophenyl)carbonate.

4. The process of claim 1, in which the dihydric hydroxy compound is selected from among the group consisting of dihydric phenols represented by any of the following formulas (I), (II), (III) and (IV):

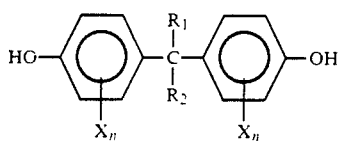
(I)

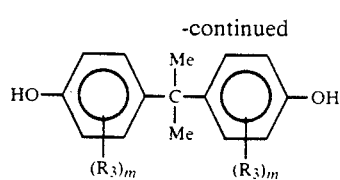
(II)

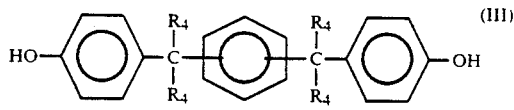
(III)

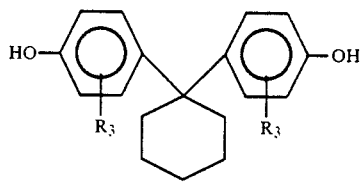
(IV)

wherein $R_1$, $R_2$, $R_3$ and $R_4$ each represents hydrogen, a straight chain or branched alkyl group having 1-8 carbon atoms, or a phenyl group; X represents a halogen atom; n is 0-4 and m is 1-4.

5. The process of claim 1, in which the catalyst is present in the amount of $10^{-1}$ to $10^{-5}$ mol per 1 mol of the dihydric hydroxy compound.

6. The process of claim 1, in which the catalyst is present in an amount of $10^{-2}$ to $10^{-4}$ mol per 1 mol of the dihydric hydroxy compound.

7. The process of claim 1, in which (A) comprises two or more dihydric hydroxy compounds.

* * * * *